United States Patent
Sugawara et al.

(10) Patent No.: US 10,591,744 B2
(45) Date of Patent: *Mar. 17, 2020

(54) LENS DRIVE DEVICE, CAMERA MODULE, AND CAMERA-EQUIPPED DEVICE

(71) Applicants: Masayoshi Sugawara, Tokyo (JP); Koki Hiwatashi, Tokyo (JP)

(72) Inventors: Masayoshi Sugawara, Tokyo (JP); Koki Hiwatashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 15/560,800

(22) PCT Filed: Mar. 23, 2016

(86) PCT No.: PCT/JP2016/001689
§ 371 (c)(1),
(2) Date: Sep. 22, 2017

(87) PCT Pub. No.: WO2016/152160
PCT Pub. Date: Sep. 29, 2016

(65) Prior Publication Data
US 2018/0113322 A1    Apr. 26, 2018

(30) Foreign Application Priority Data
Mar. 24, 2015    (JP) .................................. 2015-061253

(51) Int. Cl.
*G02B 27/64*    (2006.01)
*G02B 7/02*    (2006.01)
(Continued)

(52) U.S. Cl.
CPC ............. *G02B 27/646* (2013.01); *G02B 7/08* (2013.01); *G02B 7/09* (2013.01); *G03B 5/00* (2013.01);
(Continued)

(58) Field of Classification Search
CPC ........ G02B 27/64; G02B 27/646; G02B 7/00; G02B 7/003; G02B 7/02; G02B 7/021;
(Continued)

(56) References Cited

U.S. PATENT DOCUMENTS 5,018,836 A * 5/1991 Noda ..................... G11B 7/093
359/814
5,073,883 A * 12/1991 Mitsumori ........... G11B 7/0932
359/814
(Continued)

FOREIGN PATENT DOCUMENTS

JP    4-068323 A    3/1992
JP    11-344740 A    12/1999
(Continued)

OTHER PUBLICATIONS

International Search Report from International Application No. PCT/JP2016/001689 dated Jun. 7, 2016.
(Continued)

*Primary Examiner* — Thong Q Nguyen
(74) *Attorney, Agent, or Firm* — Brundidge & Stanger, P.C.

(57) ABSTRACT

A lens drive device has a support section for supporting a shake correction movable section relative to a shake correction stationary section. The support section has: an upper frame body; a plate-shaped first side support body for connecting the upper frame body and the shake correction stationary section; and a plate-shaped second side support body for connecting the upper frame body and the shake
(Continued)

correction movable section. The first side support body and the second side support body are formed from an elastomeric material. As the shake correction movable section moves in a first direction, the first side support body is bent in the opposite directions at two Y-hinge sections extending in a second direction. As the shake correction movable section moves in the second direction, the second side support body is bent in the opposite directions at two X-hinge sections extending in the first direction.

8 Claims, 11 Drawing Sheets

(51) Int. Cl.
*G03B 5/00* (2006.01)
*H04N 5/225* (2006.01)
*G02B 7/08* (2006.01)
*G02B 7/09* (2006.01)
*G03B 5/04* (2006.01)

(52) U.S. Cl.
CPC .............. *G03B 5/04* (2013.01); *H04N 5/225* (2013.01); *G03B 2205/0015* (2013.01); *G03B 2205/0069* (2013.01)

(58) Field of Classification Search
CPC . G02B 7/04; G02B 7/09; H04N 5/225; G03B 5/00; G03B 5/04
See application file for complete search history.

(56) References Cited

U.S. PATENT DOCUMENTS

| | | | | |
|---|---|---|---|---|
| 5,130,854 | A * | 7/1992 | Suzuki | G11B 7/0932 359/823 |
| 7,054,235 | B2 * | 5/2006 | Tsukuda | G11B 7/0932 369/44.15 |
| 9,733,448 | B1 * | 8/2017 | Bibeault | G02B 7/09 |
| 2005/0052570 | A1 | 3/2005 | Enomoto | |
| 2013/0016427 | A1 | 1/2013 | Sugawara | |
| 2014/0333829 | A1 * | 11/2014 | Lee | H04N 5/2251 348/373 |
| 2016/0013504 | A1 * | 1/2016 | Yamamoto | H01M 8/1004 429/480 |
| 2016/0154249 | A1 | 6/2016 | Yeo | |
| 2018/0348538 | A1 * | 12/2018 | Sugawara | G03B 5/00 |

FOREIGN PATENT DOCUMENTS

| | | |
|---|---|---|
| JP | 2004-125971 A | 4/2004 |
| JP | 2005-176293 A | 6/2005 |
| JP | 2007-156062 A | 6/2007 |
| JP | 2010-286810 A | 12/2010 |
| JP | 2013-210550 A | 10/2013 |
| WO | 2015/005711 A1 | 1/2015 |

OTHER PUBLICATIONS

Extended European Search Report issued in EP 16768064.4 dated Oct. 17, 2018.

* cited by examiner

LENS DRIVE DEVICE, CAMERA MODULE, AND CAMERA-EQUIPPED DEVICE

TECHNICAL FIELD

The present invention relates to a shake-correcting lens driving device, a camera module having a shake-correcting function, and a camera mounting device.

BACKGROUND ART

In general, a small-sized camera module is mounted in a mobile terminal such as a smartphone. The lens driving device has an auto-focusing function of automatically performing focusing for capturing a subject (hereinafter referred to as "AF (Auto Focus) function"), and a shake-correcting function (hereinafter referred to as "OIS (Optical Image Stabilization) function") of optically correcting shake (vibration) upon capturing an image to reduce the irregularities of the image (for example, PTL 1).

A lens driving device having the auto-focusing function and the shake-correcting function includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed at a periphery of the lens part, an auto-focusing magnet part (hereinafter referred to as "AF magnet part") separated from the AF coil part in the radial direction, and an elastic supporting part (for example, a leaf spring) configured to elastically support an auto focus movable part (hereinafter referred to as "AF movable part") including the lens part and the AF coil part with respect to an auto focus fixing part (hereinafter referred to as "AF fixing part") including the AF magnet part for example. By moving the AF movable part in the light axis direction with respect to the AF fixing part by utilizing a driving force of a voice coil motor composed of the AF coil part and the AF magnet part, automatic focusing is performed. It is to be noted that the AF fixing part may include the AF coil part, and the AF movable part may include the AF magnet part.

The OIS driving part includes, for example, a shake-correcting magnet part (hereinafter referred to as "OIS magnet part") disposed in the AF driving part, a shake-correcting coil part (hereinafter referred to as "OIS coil part") separated from the OIS magnet part, and a supporting part configured to support a shake correction movable part (hereinafter referred to as "OIS movable part") including the AF driving part and the OIS magnet part with respect to a shake correction fixing part (hereinafter referred to as "OIS fixing part") including the OIS coil part. By swaying the OIS movable part in a plane orthogonal to the light axis direction with respect to the OIS fixation part by utilizing a driving force of a voice coil motor composed of the OIS magnet part and the OIS coil part, shake correction is performed (so-called barrel shift system). The OIS magnet part can also serve as the AF magnet part, and with such a configuration, the size and the height of the lens driving device can be reduced. In addition, a suspension wire is employed as a supporting part configured to support the OIS movable part with respect to the OIS fixing part, for example.

Preferably, the diameter of the suspension wire is small in view of increasing the sensitivity of the OIS driving part (hereinafter referred to as "OIS sensitivity"). When the diameter of the suspension wire is small, however, the risk of rupture with an impact of dropping or the like is high. In addition, since the suspension wire is easily deflected in this case, the OIS movable part cannot be translated (the lens part is tilted), and the tilt characteristics in shake correction are degraded. The tilt characteristics indicate the parallelism of the OIS movable part in shake correction, and the tilt characteristics are represented by the inclination angle of the OIS movable part in movement of the lens part. In this manner, when the diameter of the suspension wire is reduced to increase the OIS sensitivity, the reliability of lens driving device is sacrificed.

CITATION LIST

Patent Literature

PLT 1
Japanese Patent Application Laid-Open No. 2013-210550

SUMMARY OF INVENTION

An object of the present invention is to provide a lens driving device which can improve the OIS sensitivity while ensuring high reliability, and a camera module and a camera mounting device including the lens driving device.

A lens driving device reflecting the first aspect of the present invention includes a shake-correcting driving part, the shake-correcting driving part including: a shake-correcting magnet part disposed at a periphery of a lens part; a shake-correcting coil part separated from the shake-correcting magnet part; and a supporting part configured to support a shake correction movable part including the shake-correcting magnet part such that the shake correction movable part is separated from a shake correction fixing part including the shake-correcting coil part in a light axis direction, the shake-correcting driving part being configured to sway the shake correction movable part with respect to the shake correction fixing part in a plane orthogonal to the light axis direction by utilizing a driving force of a voice coil motor composed of the shake-correcting coil part and the shake-correcting magnet part to perform a shake correction. The supporting part includes: an upper frame member disposed opposite to the shake correction fixing part in the light axis direction, first side supporting members disposed opposite to each other in a first direction orthogonal to the light axis direction, each of the first side supporting members having a plate shape and being configured to couple the upper frame member and the shake correction fixing part, and second side supporting members disposed opposite to each other in a second direction orthogonal to the light axis direction and the first direction, each of the second side supporting members having a plate shape and being configured to couple the upper frame member and the shake correction movable part, the first side supporting member and the second side supporting member are formed with an elastomer material, the first side supporting member includes two Y-hinge parts that are thinner than a portion around the Y-hinge parts and extend in the second direction, the first side supporting member is bent along with movement of the shake correction movable part in the first direction such that bending directions of the two Y-hinge parts are opposite directions, the second side supporting member includes two X-hinge parts that are thinner than a portion around the X-hinge parts and extend in the first direction, and the second side supporting member is bent along with movement of the shake correction movable part in the second direction such that bending directions of the two X-hinge parts are opposite directions.

A camera module reflecting the second aspect of the present invention includes: the lens driving device; a lens part mounted in the lens driving device; and an image capturing part configured to capture a subject image imaged with the lens part.

A camera mounting device reflecting the third aspect of the present invention is an information apparatus or a transport apparatus and includes the camera module.

In the present invention, the risk of damaging the side supporting member with an impact of dropping or the like is significantly low than the case where the suspension wire is employed. Accordingly, high reliability can be ensured, and the OIS sensitivity can be increased.

DESCRIPTION OF EMBODIMENTS

Figure 1A:
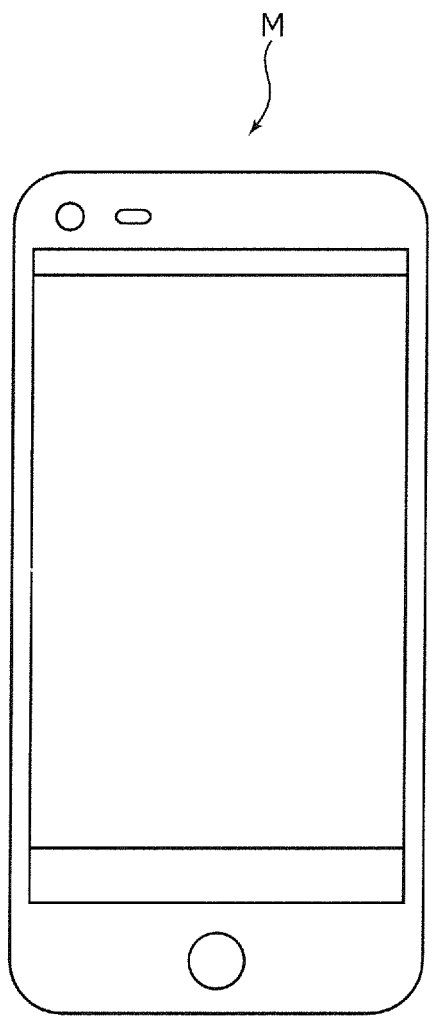
FIG. 1A and FIG. 1B illustrate a smartphone in which a camera module according to an embodiment of the present invention is mounted.
Figure 1B:
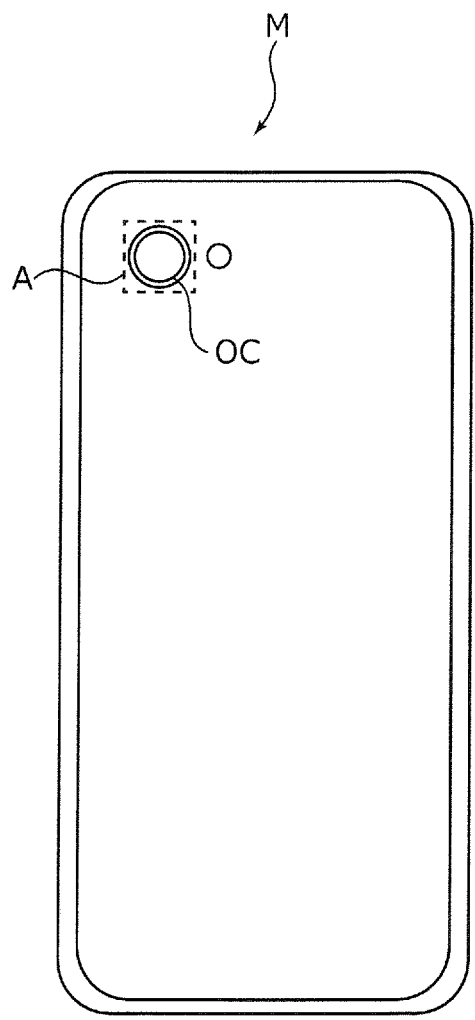

In the following, an embodiment of the present invention is described in detail with reference to the drawings. FIG. 1A and FIG. 1B illustrate smartphone M (camera mounting device) in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto-focusing function and a shake-correcting function, and captures an image without image blurring by automatically performing focusing at the time of capturing a subject and by correcting shake (vibration) at the time of capturing an image.

Figure 2:
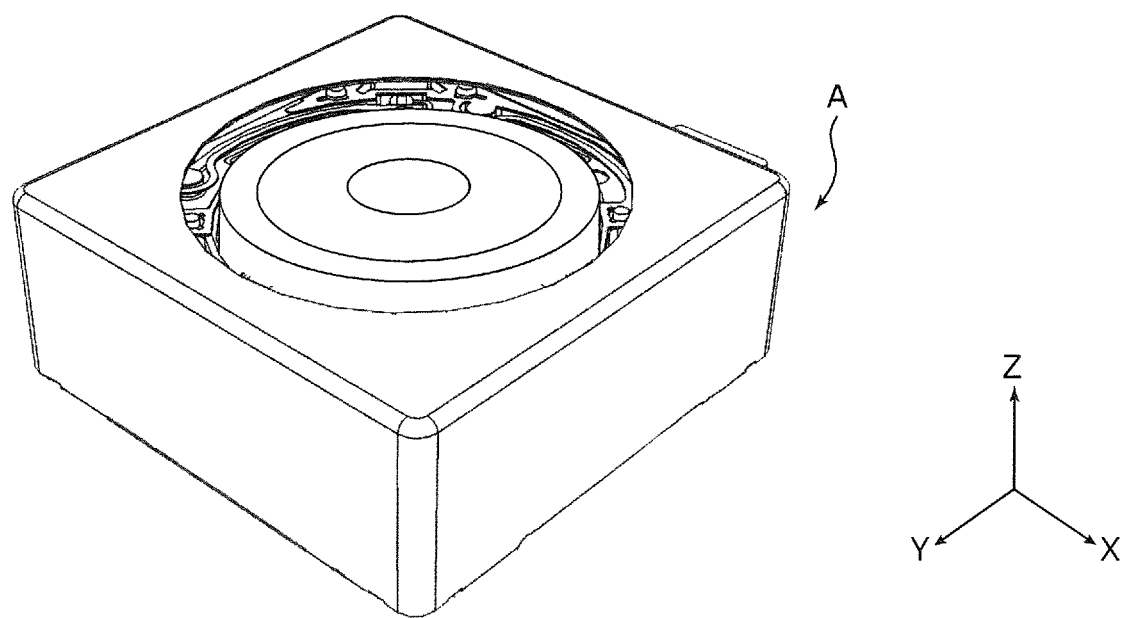
FIG. 2 is a perspective view of an external appearance of the camera module.
Figure 3:
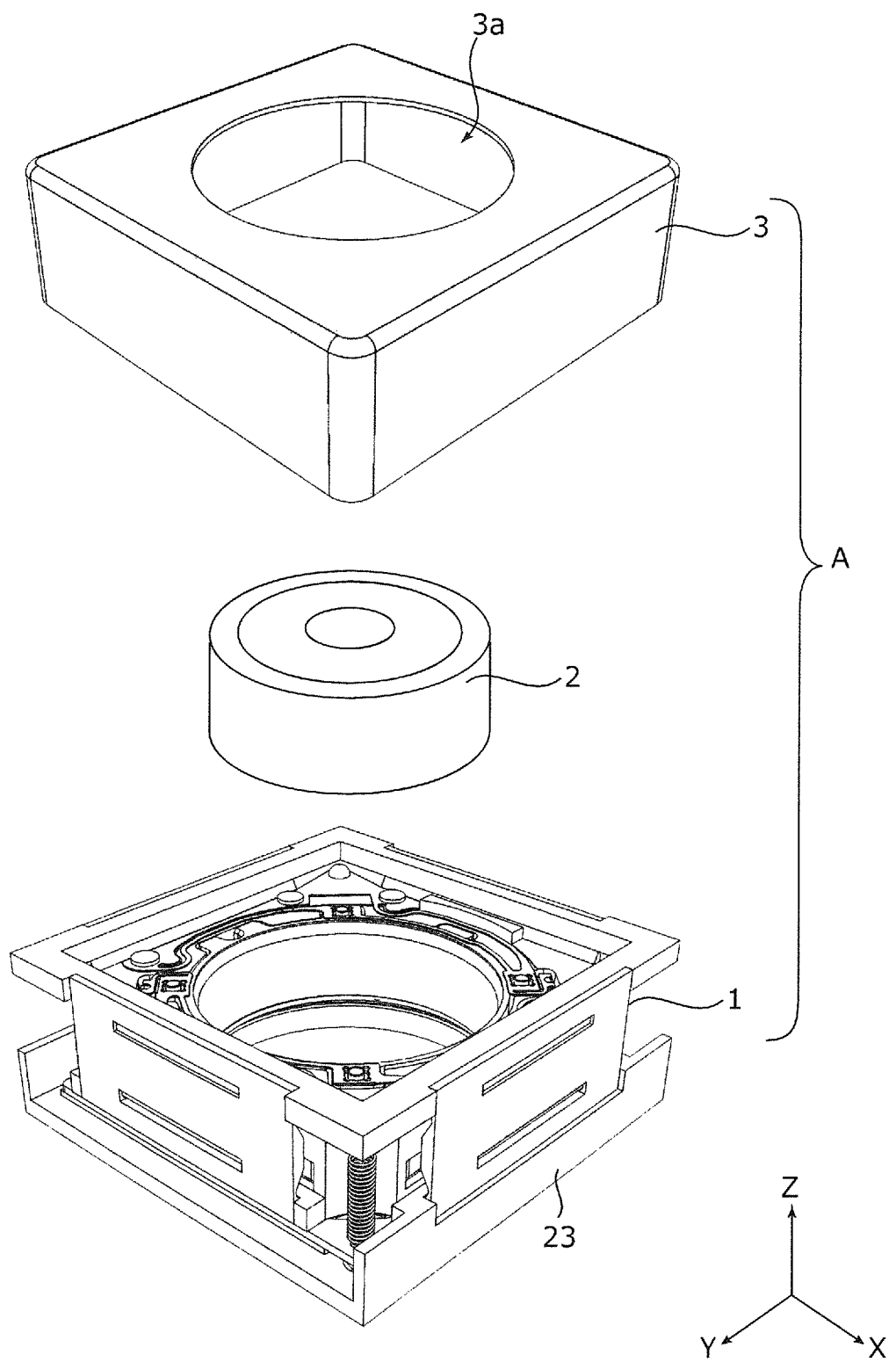
FIG. 3 is an exploded perspective view of the camera module.

FIG. 2 is a perspective view of an external appearance of camera module A. FIG. 3 is an exploded perspective view of camera module A. As illustrated in FIG. 2 and FIG. 3, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the image capturing side in the light axis direction (also referred to as "infinity position side"). In addition, the X direction and the Y direction orthogonal to the light axis direction are referred to as "light axis orthogonal direction."

Camera module A includes lens part 2 in which a lens is housed in a lens barrel having a cylindrical shape, AF and OIS lens driving device 1, an image capturing part (not illustrated) that captures a subject image imaged with lens part 2, cover 3 that covers the entirety, and the like.

As viewed in the light axis direction, cover 3 is a capped square cylindrical member having a square shape in plan view. Circular opening 3a is formed in the top surface of cover 3. Lens part 2 is exposed to the outside through opening 3aCover 3 is fixed to base 23 of OIS fixing part 20 (see FIG. 4) of lens driving device 1. It is to be noted that cover 3 may be formed with a conductive material, and may be grounded through OIS fixing part 20.

The image capturing part (not illustrated) includes an image capturing device (not illustrated), and is disposed on the image capturing side in the light axis direction of lens driving device 1, that is, the image capturing side in the light axis direction of OIS fixing part 20. The image capturing device (not illustrated) is composed of, for example, a CCD (charge coupled device) image sensor, a CMOS (complementary metal oxide semiconductor) image sensor, or the like. The image capturing device (not illustrated) captures a subject image imaged with lens part 2.

Figure 4:
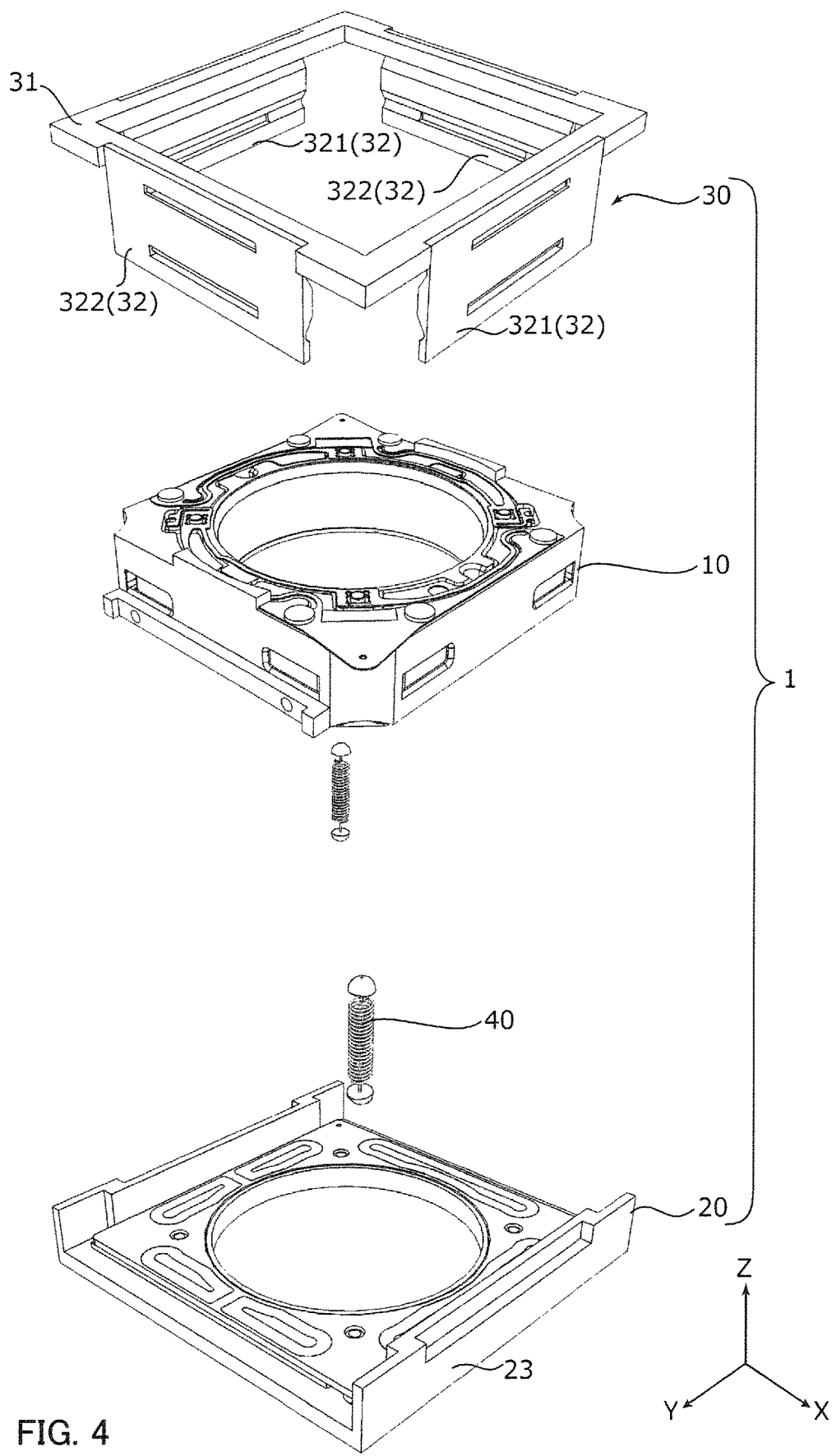
FIG. 4 is an exploded perspective view of a lens driving device.

FIG. 4 is an exploded perspective view of lens driving device 1. As illustrated in FIG. 4, lens driving device 1 includes OIS movable part 10, OIS fixing part 20, supporting part 30, coil spring 40 and the like.

OIS movable part 10 includes an OIS magnet part serving as a component of the OIS voice coil motor, and sways in the plane orthogonal to the light axis at the time of shake correction. OIS fixing part 20 includes an OIS coil part. OIS movable part 10 includes an AF driving part. OIS movable part 10 is separated from OIS fixing part 20 such that OIS movable part 10 can move in the plane orthogonal to the light axis direction. Here, OIS movable part 10 is disposed on the light reception side relative to OIS fixing part 20 in the light axis direction, and separated from OIS fixing part 20.

Supporting part 30 supports movable part 10 with respect to OIS fixing part 20. In the present embodiment, a member formed with an elastomer material, not the conventional suspension wire, is employed as supporting part 30. An elastomer is a rubber elastic member, and includes a heat curable elastomer (rubber) and a thermoplastic elastomer (elastic plastic).

Figure 5:
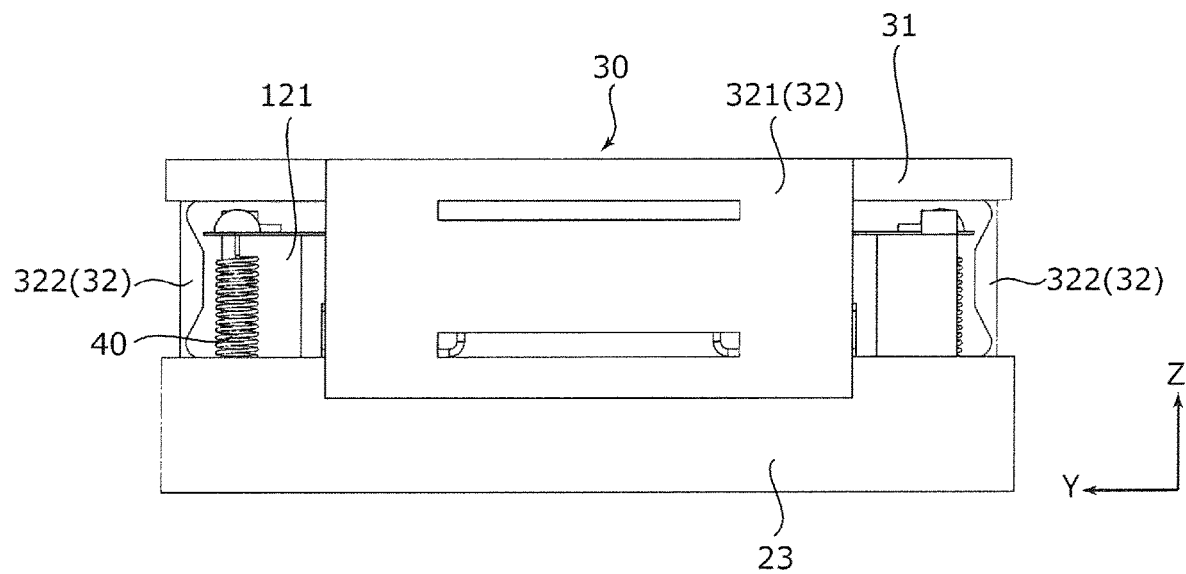
FIG. 5 is a side view of the lens driving device as viewed from the leading end side of the X direction.
Figure 6:
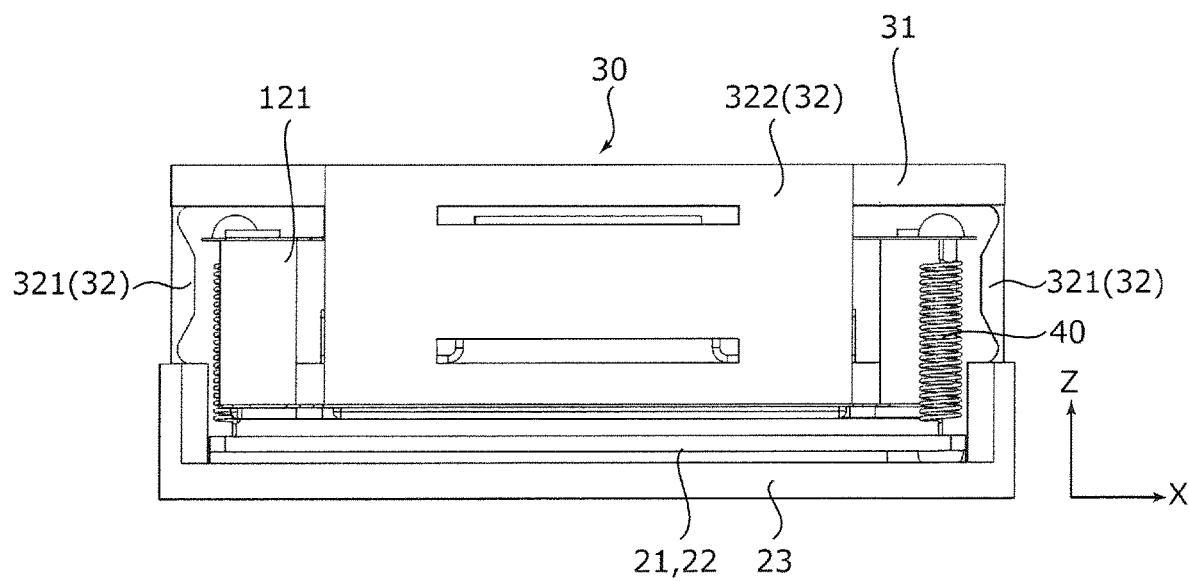
FIG. 6 is a side view of the lens driving device as viewed from the leading end side of the Y direction.

FIG. 5 is a side view of lens driving device 1 as viewed from the leading end side of the X direction. FIG. 6 is a side view of lens driving device 1 as viewed from the leading end side of the Y direction. As illustrated in FIG. 5 and FIG. 6, supporting part 30 includes upper frame member 31 and four side supporting members 32. A pair of side supporting members 32 facing each other in the X direction is referred to as "first side supporting member 321," and a pair of side supporting members 32 facing each other in the Y direction is referred to as "second side supporting member 322."

Upper frame member 31 is a frame member having a square shape in plan view, and is disposed opposite to base 23 of OIS fixing part 20 in the light axis direction. Upper frame member 31 includes, outside the four sides, supporting member fixing parts (whose reference numeral is omitted) for fixing side supporting members 32. Upper frame member 31 is formed with a material having a high rigidity. Preferably, the material of upper frame member 31 is a resin material from a view point of weight reduction, although, a metal material or a resin material may be applied. In particular, a liquid crystal polymer (LCP resin) is favorable as the material of upper frame member 31. With upper frame member 31 formed with a liquid crystal polymer, lowering due to the own weight of OIS movable part 10 can be prevented, and favorable tilt characteristics can be ensured while achieving weight reduction.

Side supporting member 32 is a plate-shaped member having a strength enough to support OIS movable part 10. Side supporting member 32 is formed with an elastomer material. With this configuration, the risk of damaging side supporting member 32 with an impact of dropping or the like is significantly low than the case where a suspension wire is employed as supporting part 30. Accordingly, high reliability can be ensured, and the OIS sensitivity of lens driving device 1 can be increased. In addition, since the primary resonance of the OIS driving part can be suppressed by utilizing the attenuation force of the elastomer, the application of the damper is unnecessary unlike the case where the suspension wire is employed, and the assembly work is eased, thus improving the productivity.

Preferably, the elastomer material is a thermoplastic elastomer (for example, polyester elastomer) for mass production which can attain a small spring constant and can allow for injection molding. A polyester elastomer has a good heat resisting property and a good low temperature property, and can have a relatively stable flexibility even with temperature change.

Figure 7A:
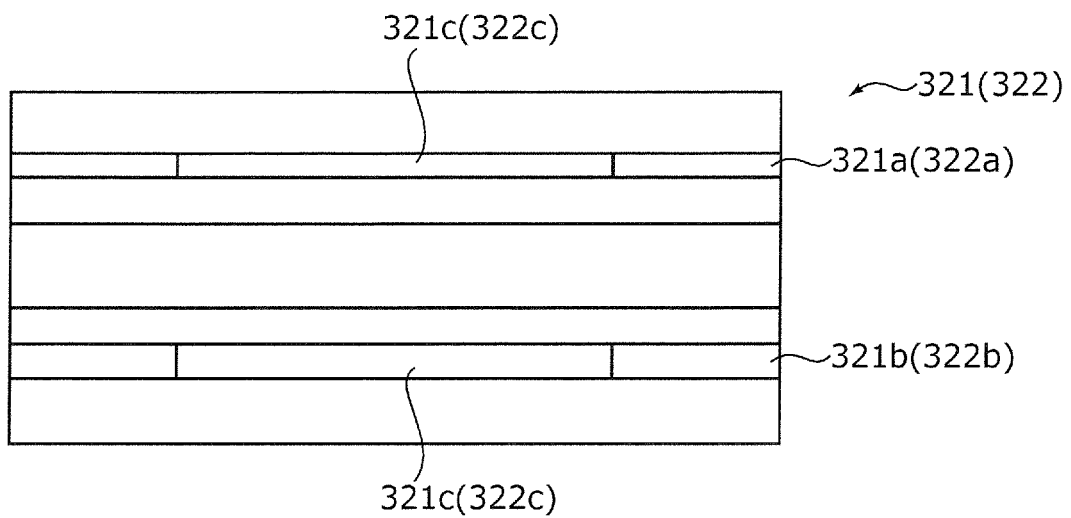
FIG. 7A and FIG. 7B illustrate shapes of a first side supporting member and a second side supporting member.
Figure 7B:
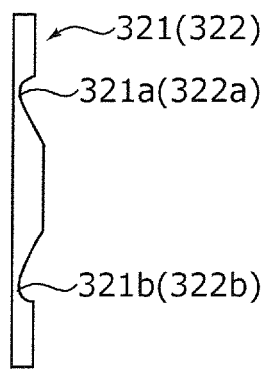

FIG. 7A and FIG. 7B illustrate shapes of first side supporting member 321 and second side supporting member 322. FIG. 7A illustrates the internal surfaces (the surfaces opposite to magnet holder 121) of first side supporting member 321 and second side supporting member 322, and FIG. 7B is a side view of first side supporting member 321 and second side supporting member 322. In FIG. 7A and FIG. 7B, the reference numerals of second side supporting member 322 are shown in parentheses.

As illustrated in FIG. 7A and FIG. 7B, first side supporting member 321 and second side supporting member 322 have a biaxial hinge structure which achieves translation of OIS movable part 10 with bending at two axes. With the mechanical hinge structure utilizing the elasticity of the elastomer, OIS movable part 10 can be moved with a small force, and accordingly power saving can be achieved. In addition, the parallelism of OIS movable part 10 is ensured, and accordingly the tilt characteristics are improved.

To be more specific, first side supporting member 321 includes two Y-hinge parts 321a and 321b extending in the Y direction, and the thickness of Y-hinge parts 321a and 321b is smaller than that of the portions around Y-hinge parts 321a and 321b. Cutout part 321c is formed at an approximate center of each of Y-hinge parts 321a and 321b in the longitudinal direction. The upper portion of first side supporting member 321 is connected with upper frame member 31, and the lower portion of first side supporting member 321 is connected with base 23 of OIS fixing part 20 (see FIG. 5 and FIG. 6).

Here, Y-hinge parts 321a and 321b are composed of hinge grooves formed on the internal surface of first side supporting member 321. Preferably, the shape of the hinge groove is, but not limited to, an R-shape. 321r, 322r. With this configuration, the durability against repetitive bending operations in shake correction is improved.

Figure 8A:
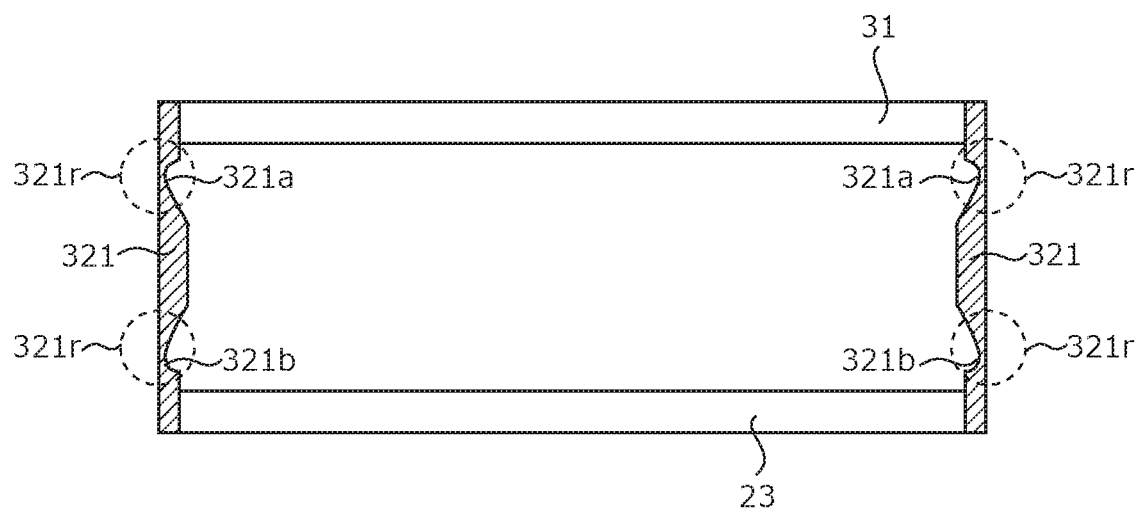
FIG. 8A and FIG. 8B illustrate a state where the first side supporting member is bent.
Figure 8B:
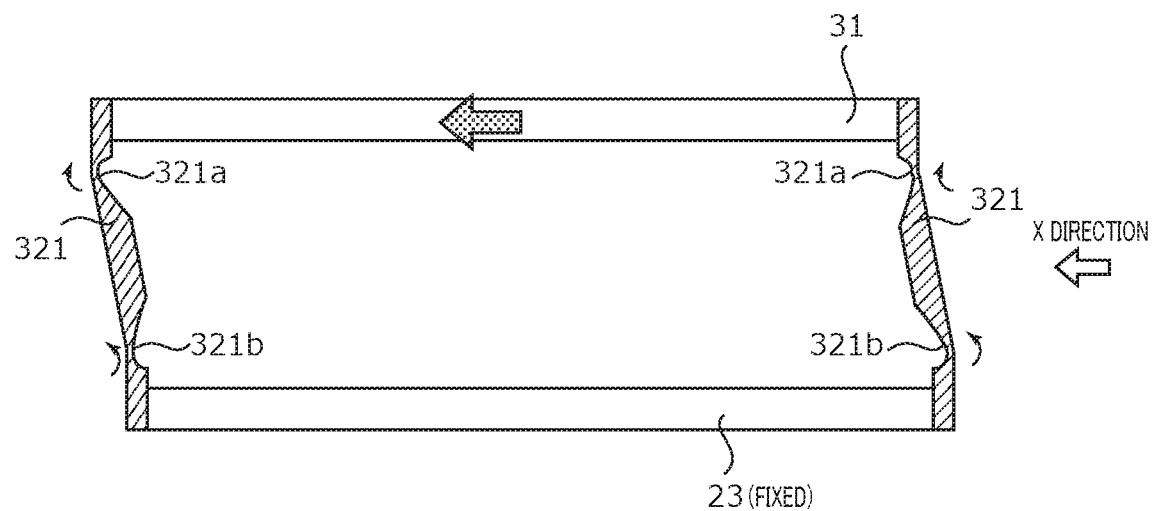

As illustrated in FIG. 8A and FIG. 8B, when a force of the X direction orthogonal to the axis direction of Y-hinge parts 321a and 321b is exerted on first side supporting member 321, the portion located on the upper side relative to Y-hinge part 321a moves in the X direction together with upper frame member 31, while the portion located on the lower side relative to Y-hinge part 321b does not move due to the connection with base 23 of OIS fixing part 20. That is, first side supporting member 321 is bent such that the bending directions of Y-hinge parts 321a and 321b are opposite directions.

The shape of second side supporting member 322 is identical to that of first side supporting member 321. Second side supporting member 322 includes two X-hinge parts 322a and 322b extending in the X direction, and the thickness of X-hinge parts 322a and 322b is smaller than that of the portions around X-hinge parts 322a and 322b. Cutout part 322c is formed at an approximate center of each of X-hinge part 322a and 322b in the longitudinal direction. The upper portion of second side supporting member 322 is connected with upper frame member 31, and the lower portion of second side supporting member 322 is connected with magnet holder 121 of OIS movable part 10 (see FIG. 5 to FIG. 6).

Figure 9A:
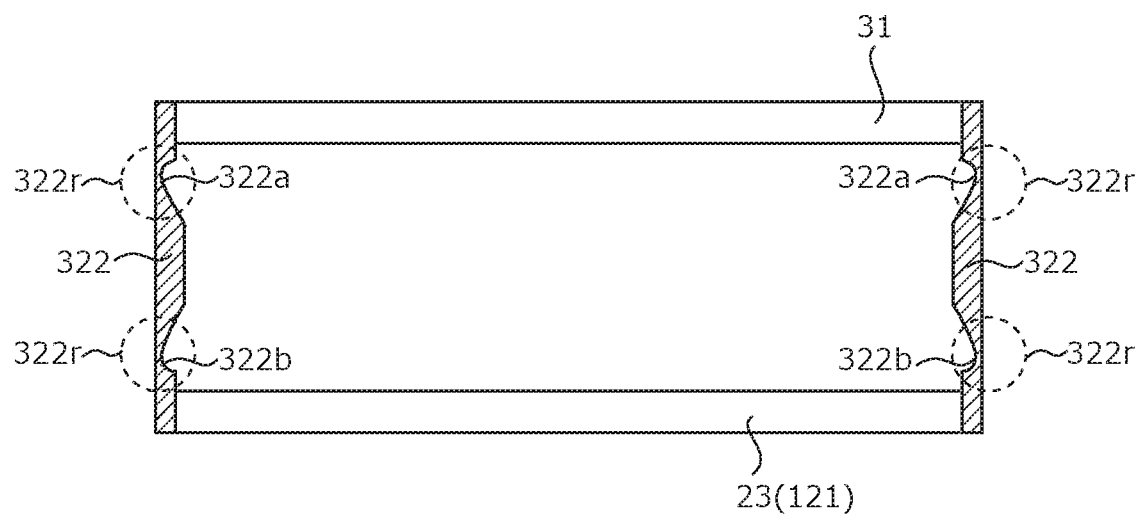
FIG. 9A and FIG. 9B illustrate a state where the second side supporting member is bent.
Figure 9B:
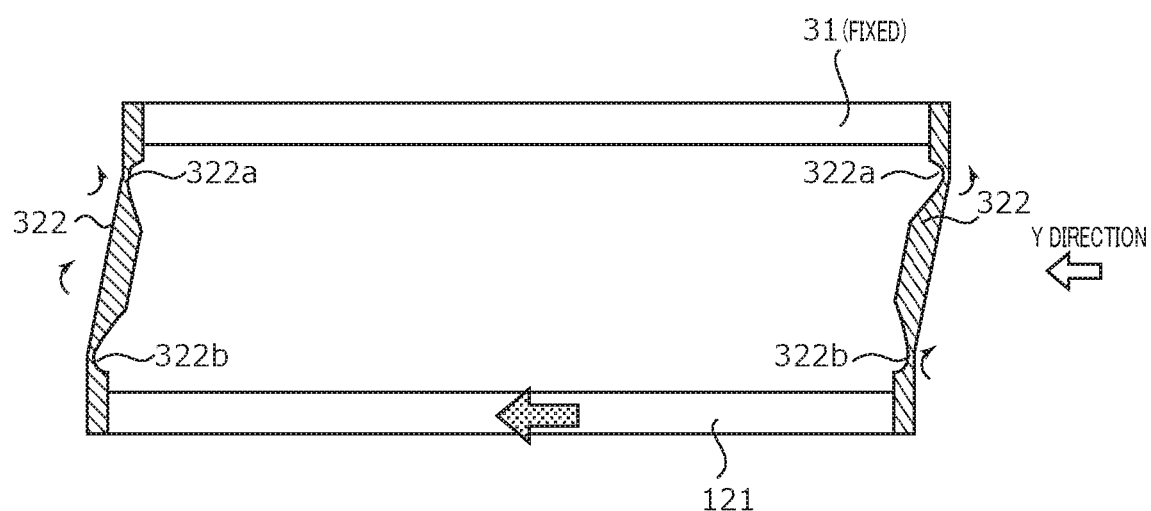

As illustrated in FIG. 9A and FIG. 9B, when a force of the Y direction orthogonal to two the axis direction of X-hinge parts 322a and 322b is exerted on second side supporting member 322, the portion located on the lower side relative to X-hinge part 322b moves in the Y direction together with OIS movable part 10 (magnet holder 121), while the portion located on the upper side relative to X-hinge part 322a does not move due to the indirect connection with OIS fixing part 20 through upper frame member 31 and first side supporting member 321. That is, second side supporting member 322 is bent such that the bending directions of X-hinge parts 322a and 322b are opposite directions.

Here, since side supporting member 32 is formed of an elastomer material, thermal expansion is caused along with temperature change. When the position of OIS movable part 10 in the light axis direction is changed due to thermal expansion, the distance between lens part 2 and image capturing part (not illustrated) and the distance between magnet part 122 and OIS coil part 211 may possibly be changed, and consequently the desired performance may not possibly be attained.

In the present embodiment, side supporting member 32 is composed of first side supporting member 321 uprightly provided on base 23 and second side supporting member 322 suspended from upper frame member 31, and first side supporting member 321 and second side supporting member 322 have the same shape. Accordingly, while first side supporting member 321 is thermally expanded toward the light reception side in the light axis direction, second side supporting member 322 is thermally expanded toward the image capturing side in the light axis direction by the same amount as the thermal expansion of first side supporting member 321. That is, the position of OIS movable part 10 in the light axis direction does not change, and therefore degradation of the performance due to thermal expansion can be prevented.

Coil spring 40 is a feeding path for feeding power to AF coil part 112 of OIS movable part 10. One end of coil spring 40 is fixed to coil substrate 21 of OIS fixing part 20 by soldering, and the other end of coil spring 40 is fixed to upper elastic supporting part 13 of OIS movable part 10 by soldering. Coil spring 40 is designed such that the movement of OIS movable part 10 in the XY plane is not blocked.

Figure 10:
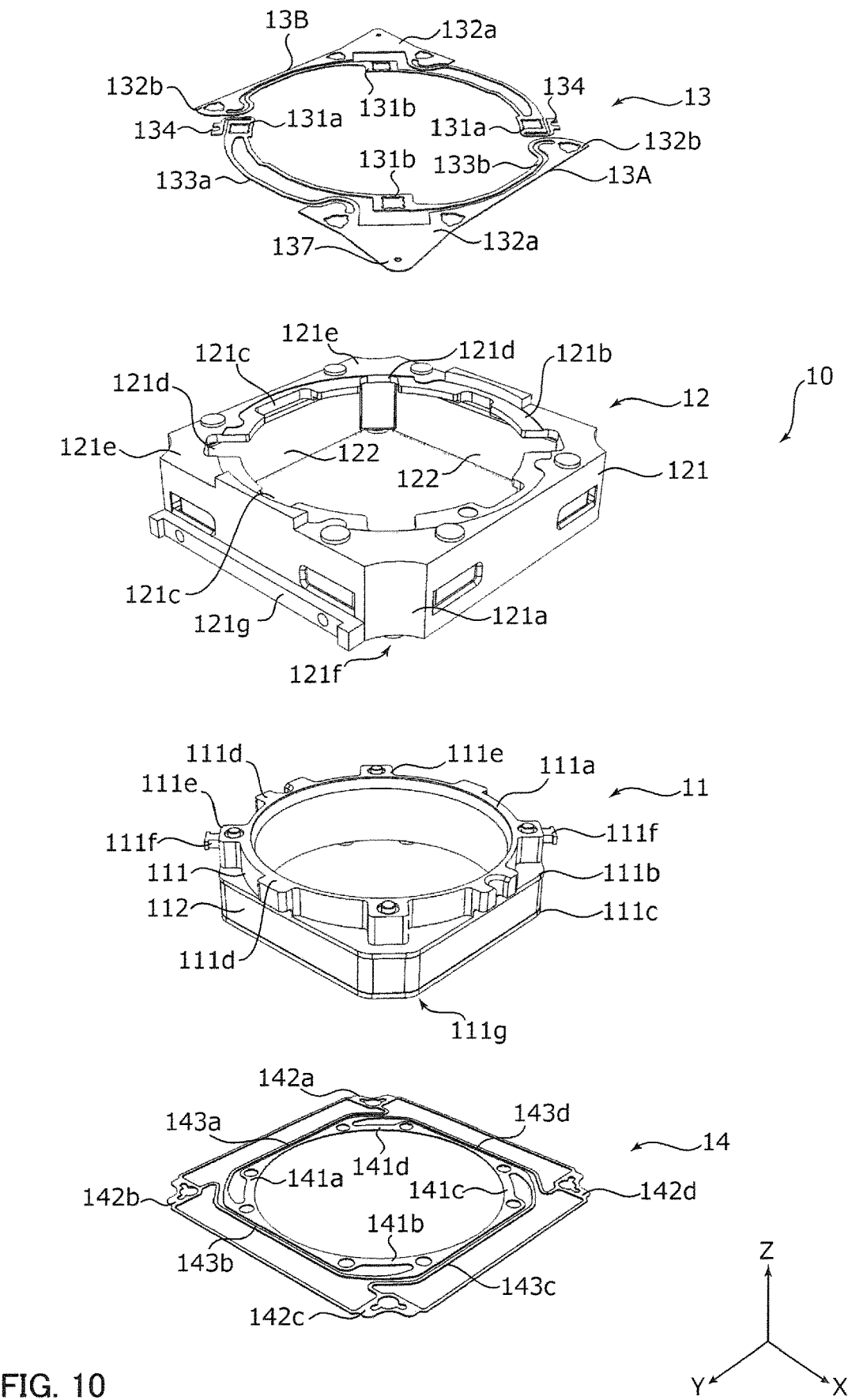
FIG. 10 is an exploded perspective view of an OIS movable part (AF driving part)

FIG. 10 is an exploded perspective view of OIS movable part 10. As illustrated in FIG. 10, OIS movable part 10 includes AF movable part 11, AF fixing part 12, upper elastic supporting part 13, lower elastic supporting part 14 and the like. AF movable part 11 is disposed on the radially inside relative to AF fixing part 12 and is separated from AF fixing part 12. AF movable part 11 is coupled with AF fixing part 12 by upper elastic supporting part 13 and lower elastic supporting part 14.

AF movable part 11 includes a coil part serving as a component of an AF voice coil motor, and moves in the light axis direction at the time of focusing. AF fixing part 12 includes a magnet part serving as a component of the AF voice coil motor. That is, the AF driving part of lens driving device 1 is of a moving coil type.

AF movable part 11 includes lens holder 111, and AF coil part 112.

Lens holder 111 is a member having a nearly square shape in plan view, and lens part 2 is fixed to lens housing part 111a having a cylindrical shape by bonding or screwing. Lens holder 111 includes upper flange part 111b and lower flange part 111c on the peripheral surface of lens housing part 111a. AF coil part 112 is wound at a part (hereinafter referred to as "coil winding part") sandwiched between upper flange part 111b and lower flange part 111c.

When AF movable part 11 moves to the light reception side in the light axis direction, the top surface of upper flange part 111b makes contact with the bottom surface of stopper part 121b of magnet holder 121, and thus further movement thereof is limited. That is, the distance from upper flange part 111b to stopper part 121b of magnet holder 121 is the movable range of AF movable part 11 to the light reception side in the light axis direction.

Lens holder 111 includes, at four portions intersecting the X direction and the Y direction (hereinafter referred to as "cross direction") of the upper periphery part of lens housing part 111a, protruding parts 111d that radially outwardly protrude. Protruding part 111d radially outwardly protrudes over upper flange part 111b and lower flange part 111c, and is located on the light reception side in the light axis direction of magnet part 122.

When AF movable part 11 moves to the image capturing side in the light axis direction, the bottom surface of protruding part 111d makes contact with the top surface of magnet part 122, and thus further movement thereof is limited. That is, the distance from protruding part 111d to magnet part 122 is the movable range of AF movable part 11 to the image capturing side in the light axis direction.

Lens holder 111 includes protruding parts 111e at four portions intersecting the directions (hereinafter referred to as "diagonal direction") rotated by 45 degrees from the cross direction of the upper periphery part of lens housing part 111a. Protruding parts 111e serve as upper spring fixing parts (hereinafter referred to as "upper spring fixing parts 111e") for fixing upper elastic supporting part 13. Upper bosses (whose reference numeral is omitted) for fixing and positioning upper elastic supporting part 13 are disposed at upper spring fixing parts 111e. In addition, tying parts 111f that radially outwardly protrude are disposed at two diagonally opposite upper spring fixing parts 111e of the four upper spring fixing parts 111e.

Lens holder 111 includes, at the four corners of the bottom surface, lower spring fixing parts 111g for fixing lower elastic supporting part 14. Lower bosses (whose reference numeral is omitted) for fixing and positioning lower elastic supporting part 14 are disposed at lower spring fixing parts 111g.

AF coil part 112 is an air-core coil that is energized at the time of focusing, and is wound around the outer peripheral surface of a coil winding part of lens holder 111. One end of AF coil part 112 is tied to one tying part 111f, and the other end of AF coil part 112 is tied to the other tying part 111f.

AF fixing part 12 includes magnet holder 121 and magnet part 122. While FIG. 5 illustrates a state where magnet holder 121 is attached on magnet part 122, magnet part 122 is attached after AF movable part 11 is inserted to magnet holder 121 in practice.

Magnet holder 121 is a square tube member having a nearly square shape in plan view. Four connection parts (four sides extending along the Z-axis direction) connecting the side walls of magnet holder 121 are curved to radially inside (curved parts 121a). Feeding coil springs 40 (see FIG. 4) are disposed at two curved parts 121a of four curved parts 121a.

Magnet holder 121 includes, at the upper portion, stopper parts 121b that protrude inward in the radial direction in a ring-shape. Stopper parts 121b include first cutout parts 121c at the four portions intersecting the cross direction, and second cutout parts 121d at the four portions intersecting diagonal direction. First cutout parts 121c correspond to protruding parts 111d of lens holder 111, and second cutout parts 121d correspond to upper spring fixing parts 111e of lens holder 111. When AF movable part 11 moves to the light reception side in the light axis direction, stopper part 121b makes contact with upper flange part 111b of lens holder 111, and thus limits the movement of AF movable part 11 to the light reception side in the light axis direction.

Magnet holder 121 includes, at the four corners of the top surface, upper spring fixing parts 121e that fix upper elastic supporting part 13. Upper bosses (whose reference numeral is omitted) for fixing and positioning upper elastic supporting part 13 are disposed at upper spring fixing parts 121e.

Magnet holder 121 includes, at the four corners of the bottom surface, lower spring fixing parts 121f that fix lower elastic supporting part 14. Lower bosses (whose reference numeral is omitted) for positioning and fixing lower elastic supporting part 14 are disposed at lower spring fixing parts 121f.

Magnet holder 121 includes, at lower portions of two surfaces facing each other in the Y direction, supporting member fixing parts 121g that fix second side supporting member 322. The lower end portions of second side supporting member 322 are disposed at supporting member fixing parts 121g and fixed thereto by bonding, for example.

Magnet part 122 includes four cuboid permanent magnets (whose reference numeral is omitted). The permanent magnets are disposed along the internal surfaces of the four side walls of magnet holder 121. Two of the four permanent magnets face each other in the X direction, and the other two permanent magnets face each other in the Y direction. The permanent magnets are magnetized such that a magnetic field orthogonal to the radial direction is formed at AF coil part 112. For example, the permanent magnets are magnetized such that the inner periphery side and the outer periphery side thereof are set to N pole and S pole, respectively. In addition, when AF movable part 11 moves to the image capturing side in the light axis direction, magnet part 122 makes contact with protruding part 111d of lens holder 111 and thus limits the movement of AF movable part 11 to the image capturing side in the light axis direction.

The AF voice coil motor is composed of magnet part 122 and AF coil part 112. In the present embodiment, magnet part 122 serves as the AF magnet part and as the OIS magnet part.

Upper elastic supporting part 13 is a leaf spring formed of beryllium copper, nickel copper, stainless-steel or the like, for example, and has a square shape as a whole in plan view. Upper elastic supporting part 13 elastically supports AF movable part 11 with respect to AF fixing part 12. Here, upper elastic supporting part 13 is composed of two upper leaf springs 13A and 13B which are disposed in a point-symmetrical manner about the light axis. Upper leaf springs 13A and 13B are shaped by punching and cutting a single sheet metal. Since the configurations of upper leaf springs 13A and 13B are similar to each other, the description of upper leaf spring 13B is omitted.

Upper leaf spring 13A includes lens holder fixing parts 131a and 131b, magnet holder fixing parts 132a and 132b, and arm parts 133a and 133b. Lens holder fixing parts 131a and 131b are coupled with each other at the internal edge (whose reference numeral is omitted) extending along the top surface of lens housing part 111a of lens holder 111. Magnet holder fixing parts 132a and 132b are coupled with each other at the external edge (whose reference numeral is omitted) extending along of the upper periphery of magnet holder 121. In addition, upper leaf spring 13A includes coil connecting part 134 extending from lens holder fixing part 131a on the radially outside of the lens holder fixing part 131a.

Each of lens holder fixing parts 131a and 131b has a shape corresponding to upper spring fixing part 111e of lens holder 111. When the positioning bosses (whose reference numeral is omitted) of upper spring fixing parts 111e are fitted into the fixation holes (whose reference numeral is omitted) of lens holder fixing parts 131a and 131b, upper leaf spring 13A is positioned with respect to lens holder 111, and fixed thereto by thermally caulking the positioning bosses, for example. Coil connecting part 134 is electrically connected to AF coil part 112 tied to tying part 111f of lens holder 111.

Each of magnet holder fixing parts 132a and 132b has a shape corresponding to upper spring fixing part 121e of magnet holder 121. When positioning bosses (whose reference numeral is omitted) of upper spring fixing parts 121e are fitted into the fixation holes (whose reference numeral is omitted) of magnet holder fixing parts 132a and 132b, upper leaf spring 13A is positioned with respect to magnet holder 121, and fixed thereto by thermally caulking the positioning bosses, for example. In addition, one end of coil spring 40 is connected at vertex part 137 of magnet holder fixing part 132a (hereinafter referred to as "coil spring connecting part 137").

Arm parts 133a and 133b couple lens holder fixing part 131a and magnet holder fixing part 132b, and lens holder fixing part 131b and magnet holder fixing part 132b, respectively. Arm parts 133a and 133b are elastically deformed when AF movable part 11 moves in the light axis direction.

As with upper elastic supporting part 13, lower elastic supporting part 14 (hereinafter referred to as "lower leaf spring 14") is a leaf spring made of beryllium copper, nickel copper, stainless-steel or the like, and has a square shape in plan view as a whole. Lower leaf spring 14 elastically supports AF movable part 11 with respect to AF fixing part 12. Lower leaf spring 14 is shaped by punching and cutting a single sheet metal, for example.

Lower leaf spring 14 includes lens holder fixing parts 141a to 141d, magnet holder fixing parts 142a to 142d, and arm parts 143a to 143d. Adjacent portions of lens holder fixing parts 141a to 141d are coupled with each other at the internal edge (whose reference numeral is omitted) extending along the bottom surface of lens housing part 111a of lens holder 111, inside arm parts 143a to 143d. Adjacent portions of magnet holder fixing parts 142a to 142d are coupled with each other at the external edge (whose reference numeral is omitted) extending along the lower periphery of magnet holder 121, outside arm parts 143a to 143d.

Each of lens holder fixing parts 141a and 141d has a shape corresponding to lower spring fixing part 111g of lens holder 111. When positioning bosses (not illustrated) of lens holder 111 are fitted into fixation holes (whose reference numeral is omitted) of lens holder fixing parts 141a to 141d, lower leaf spring 14 is positioned with respect to lens holder 111, and fixed thereto by thermally caulking the positioning bosses, for example. When AF movable part 11 moves in the light axis direction, lens holder fixing parts 141a to 141d are displaced together with AF movable part 11.

Magnet holder fixing parts 142a to 142d have shapes corresponding to lower spring fixing parts 121f of magnet holder 121. When positioning bosses (not illustrated) of magnet holder 121 are fitted into fixation holes (whose reference numeral is omitted) of magnet holder fixing parts 142a to 142d, lower leaf spring 14 is positioned with respect to magnet holder 121, and fixed thereto by thermally caulking the positioning bosses, for example.

Arm parts 143a to 143d couple lens holder fixing parts 141a to 141d and magnet holder fixing parts 142a to 142d to each other, respectively. Arm parts 143a to 143d are elastically deformed when AF movable part 11 moves.

At the time of assembling OIS movable part 10 (AF driving part), first, magnet holder fixing parts 132a and 132b of upper leaf springs 13A and 13B are attached to upper spring fixing parts 121e of magnet holder 121. In addition, lens holder fixing parts 141a to 141d of lower leaf spring 14 are attached to lower spring fixing parts 111g of lens holder 111.

Next, lens holder 111 is fitted into magnet holder 121 from the image capturing side in the light axis direction. At this time, protruding parts 111d of lens holder 111 are fitted to first cutout parts 121c of magnet holder 121, and upper spring fixing parts 111e are fitted to second cutout parts 121d. Then, lens holder fixing parts 131a and 131b of upper leaf springs 13A and 13B are attached to upper spring fixing parts 111e of lens holder 111.

Each of coil connecting part 134 extending from lens holder fixing part 131a is soldered and electrically connected to one end and the other of AF coil part 112 tied to tying part 111f of lens holder 111. In addition, magnet holder fixing parts 142a to 142b of lower leaf spring 14 are attached to lower spring fixing part 121f of magnet holder 121.

Magnet part 122 is inserted from the region surrounded by the external edge (whose reference numeral is omitted) and arm part 143a to 143c of lower leaf spring 14, and bonded to magnet holder 121. In this manner, OIS movable part 10 (AF driving part) is assembled.

Figure 11:
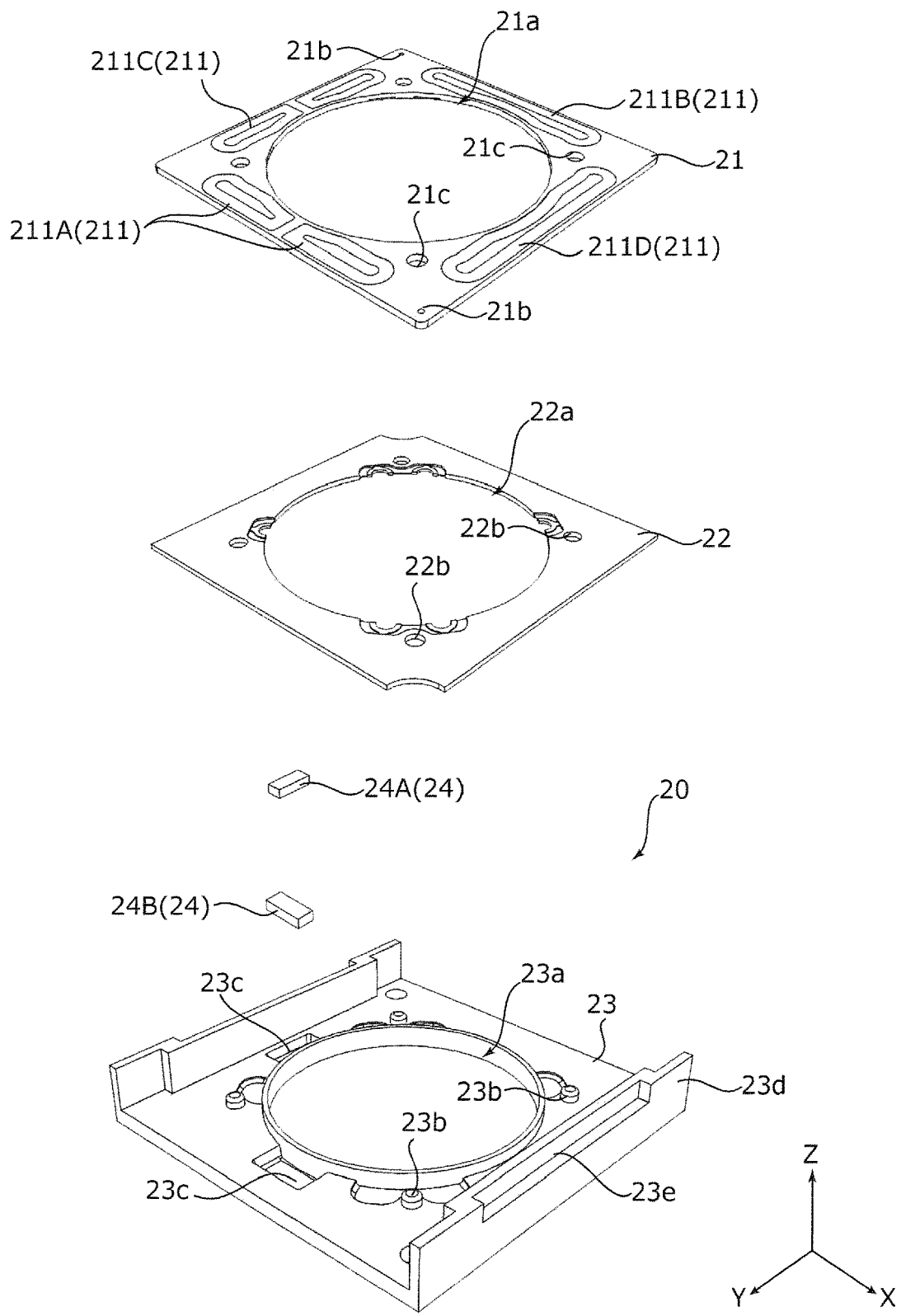
FIG. 11 is an exploded perspective view of an OIS fixing part.

FIG. 11 is an exploded perspective view of OIS fixing part 20. As illustrated in FIG. 11, OIS fixing part 20 includes coil substrate 21, sensor substrate 22, base 23, position detection part 24 and the like.

In plan view, coil substrate 21 has a square shape, and has circular opening 21a at a center portion. Coil substrate 21 includes coil spring fixation holes 21b for fixing one end (lower end) of coil spring 40 at two diagonally opposite portions of the four corners. In addition, coil substrate 21 includes positioning holes 21c at positions which intersect the diagonal direction at the peripheral portion of opening 21a.

Coil substrate 21 includes OIS coil part 211 at a position facing magnet part 122 in the light axis direction. OIS coil part 211 includes four OIS coils 211A to 211D corresponding to magnet parts 122. Each of OIS coils 211A and 211C is composed of two separate coils.

The sizes and positions of OIS coil part 211 and magnet part 122 are set such that the magnetic field radiated from the bottom surfaces of magnet parts 122 traverses the long side portions of OIS coils 211A to 211D in the Z direction. The OIS voice coil motor is composed of magnet part 122 and OIS coil part 211.

As with coil substrate 21, sensor substrate 22 has a square shape in plan view, and has circular opening 22a at a center portion. Sensor substrate 22 includes, at the peripheral portion of opening 22a, positioning holes 22b at positions corresponding to positioning holes 21c of coil substrate 21. Sensor substrate 22 includes a power-source line (not illustrated) for feeding power to AF coil part 112, OIS coil part 211, and position detection part 24, a signal line (not illustrated) for a detection signal output from position detection part 24, and the like.

Position detection part 24 is composed of Hall devices 24A and 24B (magnetic sensors) that detect the magnetic field by utilizing Hall effect, for example. Hall devices 24A and 24B are fixed at adjacent two sides of the bottom surface of sensor substrate 22 at approximate centers thereof, and disposed at Hall device housing parts 23c of base 23. By detecting the magnetic field formed by magnet part 122 with Hall devices 24A and 24B, the position of OIS movable part 10 in the XY plane can be specified. It is to be noted that a position detecting magnet may be disposed independently of magnet part 122 in OIS movable part 10.

As with coil substrate 21, base 23 has a square shape in plan view, and has circular opening 23a at a center portion. Base 23 includes, at the peripheral portion of opening 23a, positioning bosses 23b at positions corresponding to positioning holes 21c of coil substrate 21 and positioning holes 22b of sensor substrate 22. In addition, base 23 includes, at the peripheral portion of opening 23a, Hall device housing parts 23c at portions between separate coils of OIS coil 211A and 211C, or in other words, at approximate centers in the longitudinal direction.

Base 23 includes side walls 23d facing each other in the X direction, and each side wall 23d includes supporting member fixing part 23e that fixes first side supporting member 321. The lower end portions of first side supporting member 321 are disposed at supporting member fixing parts 23e and fixed thereto by bonding, for example.

At the time of assembling OIS fixing part 20, first, coil substrate 21 and sensor substrate 22 are bonded by soldering. In this manner, the power-source line (not illustrated) of sensor substrate 22 and OIS coil part 211 are electrically connected to each other. Next, positioning holes 21c of coil substrate 21 and positioning holes 22b of sensor substrate 22 are fitted to positioning bosses 23b of base 23, to dispose coil substrate 21 and sensor substrate 22 on base 23. In this manner, OIS fixing part 20 is assembled.

At the time of assembling lens driving device 1, one end of second side supporting member 322 of supporting part 30 is fixed to supporting member fixing parts 121g of magnet holder 121. In addition, one end of first side supporting member 321 of supporting part 30 is fixed to supporting member fixing parts 23e of base 23. Upper frame member 31 of supporting part 30 is provided over base 23 on the light reception side in the light axis direction with side supporting member 321. In addition, OIS movable part 10 is suspended by upper frame member 31 with second side supporting member 322.

Accordingly, when OIS movable part 10 moves in the X direction, only first side supporting member 321 is elastically deformed, while second side supporting member 322 is not elastically deformed. When OIS movable part 10 moves in the Y direction, only second side supporting member 322 is elastically deformed, while first side supporting member 321 is not elastically deformed. That is, OIS movable part 10 can independently move in the X direction and the Y direction.

In addition, one ends (upper ends) of coil springs 40 are inserted to coil spring connecting parts 137 of upper leaf springs 13A and 13B, and fixed thereto by soldering. With this configuration, coil spring 40 and upper leaf springs 13A and 13B are electrically connected to each other. The other ends (lower ends) of coil springs 40 are inserted into wire fixation holes 21b of coil board 21, and fixed thereto by soldering. In this manner, the power-source line of sensor substrate 22 and coil spring 40 are electrically connected to each other. Through coil spring 40 and upper leaf springs 13A and 13B, power can be fed to AF coil part 112.

In lens driving device 1, when OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction). Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed. The energization current of OIS coil part 211 is controlled based on the detection result of Hall devices 24A and 24B such that a shake detected by a shake detection part (for example, a gyro sensor, not illustrated) is offset with a sway of OIS movable part 10.

In addition, in lens driving device 1, when AF coil part 112 is energized, a Lorentz force is generated at AF coil part 112 by interaction between the magnetic field of magnet part 122 and the current flowing through AF coil part 112. The direction of the Lorentz force is a direction (the Z direction) orthogonal to the direction of the magnetic field (X direction or Y direction) and to the direction of the current flowing through the AF coil part 112 (the Y direction or the X direction). With this force serving as the driving force of the AF voice coil motor, AF movable part 11 including AF coil part 112 moves in the light axis direction, and thus focusing is performed. The focusing position is adjusted by analyzing multiple pieces of image information acquired by an image capturing part (not illustrated) while moving AF movable part 11, and by performing a contrast evaluation, for example.

In an non-energization state where focusing is not performed, AF movable part 11 is kept suspended between the infinity position and the macro position with upper elastic supporting part 13 and lower elastic supporting part 14 (hereinafter referred to as "reference state"), for example. That is, in OIS movable part 10, AF movable part 11 (lens holder 111) is elastically supported such that AF movable part 11 is displaceable in the Z direction in the state where the position of AF movable part 11 with respect to AF fixing part 12 (magnet holder 121) is set by upper elastic supporting part 13 and lower elastic supporting part 14. At the time of focusing, the direction of the current is controlled based on whether AF movable part 11 is moved from the reference state toward the macro position side or toward the infinity position side. In addition, the value of the current is controlled based on the movement length of AF movable part 11.

As described above, lens driving device 1 includes a shake-correcting driving part, and the shake-correcting driving part includes: magnet part 122 (shake-correcting magnet part) disposed at a periphery of lens part 2; OIS coil part 211 (shake-correcting coil part) separated from magnet part 122; and supporting part 30 configured to support OIS movable part 10 (shake correction movable part) including magnet part 122 such that OIS movable part 10 is separated from OIS fixing part 20 (shake correction fixing part) including OIS coil part 211 in a light axis direction, the shake-correcting driving part being configured to sway OIS movable part 10 with respect to OIS fixing part 20 in a plane orthogonal to the light axis direction by utilizing a driving force of a voice coil motor composed of OIS coil part 211 and magnet part 122 to perform a shake correction. Supporting part 30 includes: upper frame member 31 disposed opposite to OIS fixing part 20 in the light axis direction, first side supporting members 321 disposed opposite to each other in a X-direction (first direction) orthogonal to the light axis direction, each of first side supporting members 321 having a plate shape and being configured to couple upper frame member 31 and OIS fixing part 20, and second side supporting members 322 disposed opposite to each other in a Y-direction (second direction) orthogonal to the light axis direction and the X-direction, each of second side supporting members 322 having a plate shape and being configured to couple upper frame member 31 and OIS movable part 10, first side supporting member 321 and second side supporting member 322 are formed with an elastomer material, first side supporting member 321 includes two Y-hinge parts 321*a*, 321*b* that are thinner than a portion around Y-hinge parts 321*a*, 321*b* and extend in the Y-direction, first side supporting member 321 is bent along with movement of OIS movable part 10 in the X-direction such that bending directions of two Y-hinge parts 321*a*, 321*b* are opposite directions, second side supporting member 322 includes two X-hinge parts 322*a*, 322*b* that are thinner than a portion around X-hinge parts 322*a*, 322*b* and extend in the X-direction, and second side supporting member 322 is bent along with movement of OIS movable part 10 in the Y-direction such that bending directions of the two X-hinge parts 322*a*, 322*b* are opposite directions.

With lens driving device 1, the risk of damaging side supporting member 32 with an impact of dropping or the like is significantly lower than the case where a suspension wire is employed. Accordingly, high reliability can be ensured, and the OIS sensitivity can be increased.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the lens driving device has an AF function and an OIS function in the embodiment, the present invention is applicable to a lens driving device having an OIS function.

In addition, for example, first side supporting member 321 may be connected with a component of OIS fixing part 20 other than base 23. Second side supporting member 322 may be connected with a component of OIS movable part 10 other than magnet holder 121. Furthermore, upper frame member 31, first side supporting member 321, and second side supporting member 322 may be integrally formed by injection molding, for example.

In addition, the shape and the like of Y-hinge parts 321*a* and 321*b* of first side supporting member 321 and X-hinge parts 322*a* and 322*b* of second side supporting member 322 are not limited as long as the parts are thinner than the portions around the parts, and function as the axes at the time of bending.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a web camera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, such as an automobile.

Figure 12A:
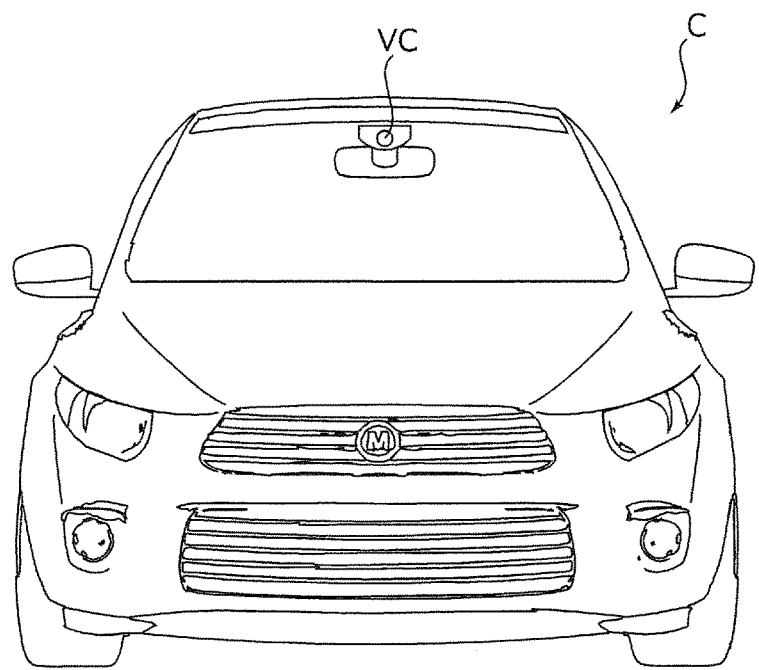
FIG. 12A and FIG. 12B illustrate an automobile as a camera mounting device in which an in-vehicle camera module is mounted.
Figure 12B:
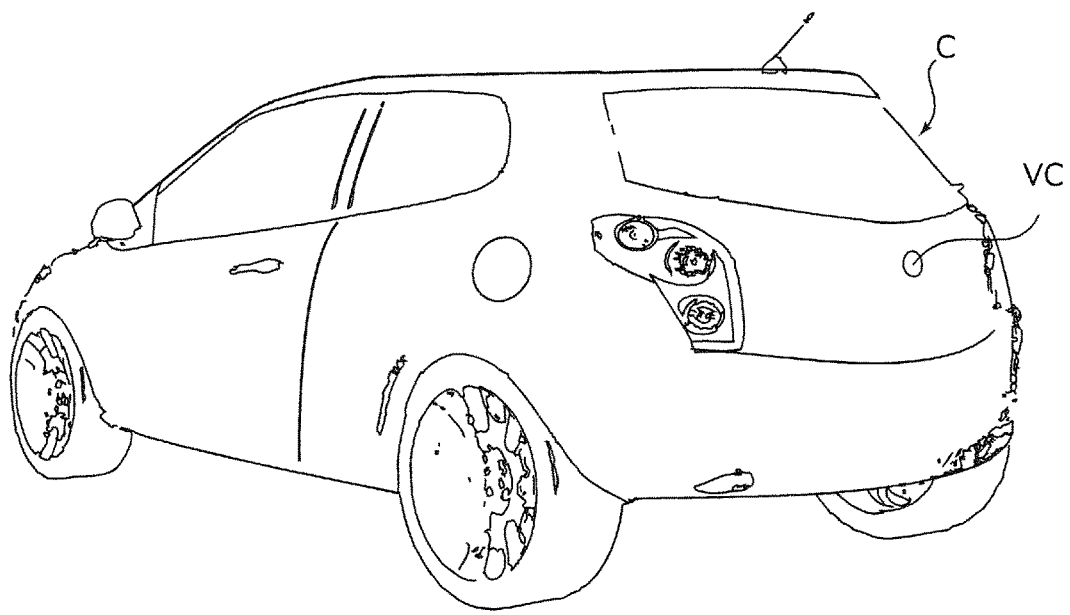

FIG. 12A and FIG. 12B illustrate automobile C serving as a camera mounting device in which an in-vehicle camera module vehicle camera (VC) is mounted. FIG. 12A is a front view of automobile C, and FIG. 12B is a rear perspective view of automobile C. In automobile C, camera module A described in the embodiment is mounted as in-vehicle camera module VC. As illustrated in FIG. 12A and FIG. 12B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof. Although embodiments of the present invention has been described and illustrated in detail, it is clearly understood that the same is by way of illustrated and example only and is not to be taken by way of limitation, the scope of the present invention being interpreted by terms of the appended claims.

This application is entitled to and claims the benefit of Japanese Patent Application No. 2015-061253 dated Mar. 24, 2015, the disclosure of which including the specification, drawings and abstract is incorporated herein by reference in its entirety.

REFERENCE SIGNS LIST

1 Lens driving device
2 Lens part
3 Cover
10 OIS movable part (shake correction movable part)
11 AF movable part (auto focus movable part)
111 Lens holder
112 AF coil part (auto-focusing coil part)
12 AF fixing part (auto focus fixing part)
121 Magnet holder
122 Magnet part (shake-correcting magnet part, auto-focusing magnet part)
13 Upper elastic supporting part (elastic supporting part)
13A, 13B Upper leaf spring
14 Lower elastic supporting part (elastic supporting part), lower leaf spring
20 OIS fixing part (shake correction fixing part)
21 Coil substrate
211 OIS coil part (shake-correcting coil part)
22 Sensor substrate
23 Base
24 Position detection part
24A, 24B Hall device
30 Supporting part
31 Upper frame member
32 Side supporting member
321 First side supporting member
321a, 321b Y-hinge part
322 Second side supporting member
322a, 322b X-hinge part
M Smartphone (camera mounting device)
A Camera module

The invention claimed is:

1. A lens driving device comprising
a shake-correcting driving part, the shake-correcting driving part including:
a shake-correcting magnet part disposed at a periphery of a lens part;
a shake-correcting coil part separated from the shake-correcting magnet part; and
a supporting part configured to support a shake correction movable part including the shake-correcting magnet part such that the shake correction movable part is separated from a shake correction fixing part including the shake-correcting coil part in a light axis direction, the shake-correcting driving part being configured to sway the shake correction movable part with respect to the shake correction fixing part in a plane orthogonal to the light axis direction by utilizing a driving force of a voice coil motor composed of the shake-correcting coil part and the shake-correcting magnet part to perform a shake correction, wherein:
the supporting part includes:
an upper frame member disposed opposite to the shake correction fixing part in the light axis direction,
two first side supporting members disposed opposite to each other in a first direction orthogonal to the light axis direction, each of the first side supporting members having a plate shape and being configured to couple the upper frame member and the shake correction fixing part, and
two second side supporting members disposed opposite to each other in a second direction orthogonal to the light axis direction and the first direction, each of the second side supporting members having a plate shape and being configured to couple the upper frame member and the shake correction movable part,
the first side supporting members and the second side supporting members are formed with an elastomer material,
each of the first side supporting members includes first and second Y-hinge parts that are thinner than a portion around the first and the second Y-hinge parts and that extend in the second direction, wherein
each of the first side supporting members is bent along with movement of the shake correction movable part in the first direction such that bending directions of the first Y-hinge parts are identical to each other and bending directions of the second Y-hinge parts are identical to each other while the bending directions of the first Y-hinge parts and the bending directions of the second Y-hinge parts are opposite to each other,
each of the second side supporting members includes first and second X-hinge parts that are thinner than a portion around the first and the second X-hinge parts and that extend in the first direction, wherein
each of the second side supporting members is bent along with movement of the shake correction movable part in the second direction such that bending directions of the first X-hinge parts are identical to each other and bending directions of the second X-hinge parts are identical to each other while the bending directions of the first X-hinge parts and the bending directions of the second X-hinge parts are opposite to each other.

2. The lens driving device according to claim 1, wherein the first and the second X-hinge parts and the first and the second Y-hinge parts are hinge grooves formed on a surface, respectively.

3. The lens driving device according to claim 2, wherein the hinge groove has an R-shape.

4. The lens driving device according to claim 1, wherein the upper frame member is formed with a liquid crystal polymer.

5. The lens driving device according to claim 1, wherein:
the shake correction movable part includes an auto-focusing driving part, the auto-focusing driving part including:
an auto-focusing coil part disposed at a periphery of the lens part,
an auto-focusing magnet part separated from the auto-focusing coil part in a radial direction, and
an elastic supporting part configured to elastically support, with respect to an auto focus fixing part including one of the auto-focusing coil part and the auto-focusing magnet part, an auto focus movable part including the other of the auto-focusing coil part and the auto-focusing magnet part, the auto-focusing driving part being configured to move the auto focus movable part in the light axis direction with respect to the auto focus fixing part by utilizing a driving force of a voice coil motor composed of the auto-focusing coil part and auto-focusing magnet part to perform automatic focusing;
the lens driving device includes a power feeding member configured to connect the shake correction fixing part and the auto focus fixing part; and
power is fed to the auto-focusing coil part through the power feeding member and the elastic supporting part.

6. The lens driving device according to claim 5, wherein the power feeding member is a coil spring configured to connect the shake correction fixing part and the auto focus fixing part to each other.

7. A camera module comprising:
    the lens driving device according to claim 1; and
    the lens part mounted in the lens driving device.

8. A camera mounting device which is an information apparatus or a transport apparatus, wherein the camera mounting device includes the camera module according to claim 7.

* * * * *